June 26, 1945.                    M. C. BOYD                    2,379,274
                    LATERAL CONTROL DEVICES FOR AIRCRAFT
                    Filed Aug. 26, 1940            3 Sheets-Sheet 1

Inventor
MILLARD C. BOYD,
By Everett N. Curtis
            Attorney

Inventor
MILLARD C. BOYD,
By Everett N. Curtis
Attorney

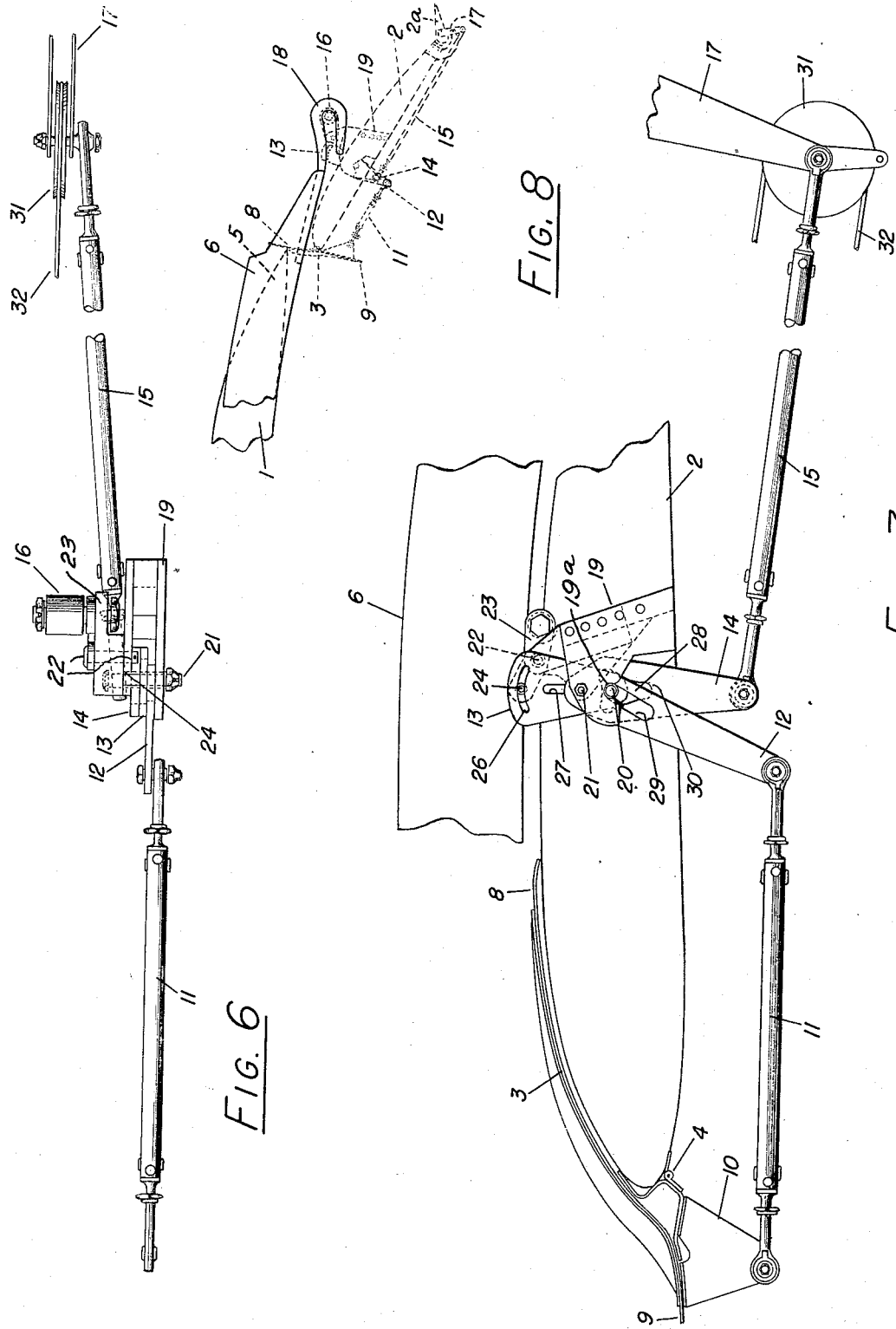

Patented June 26, 1945

2,379,274

UNITED STATES PATENT OFFICE 2,379,274

LATERAL CONTROL DEVICE FOR AIRCRAFT

Millard C. Boyd, San Diego, Calif., assignor to The Ryan Aeronautical Company, San Diego, Calif., a corporation of California Application August 26, 1940, Serial No. 354,186

5 Claims. (Cl. 244—42)

My invention relates to a lateral control device for use in conjunction with any type of extensible airfoil flap and its objects are to provide mechanical means whereby the pilot, using normal control motions may create turbulence of air in the regions of the extended airfoil or flap, so as to impede or impair the lift thereof to any desired degree, and thereby effect a greater degree and range of lateral control than has heretofore been achievable; may permit said mechanical means and operative parts automatically to engage, become operative and lock in an operative position when the extensible airfoil or flap is projected or extended to its operating position; and may permit said mechanical means and operative parts to automatically retract, fold away and lock in inoperative position when the extensible airfoil or flap is returned to its retracted or inoperative position, at which time lateral control is provided in a conventional manner by some form of aileron well known in the art.

Other objects will appear as illustrated in the drawings and as hereinafter set forth and described.

My device is of particular advantage when used in conjunction with the well-known "Fowler extensible airfoil," or airfoils of a similar mechanical and aerodynamic action known to the art, since it provides a means of obtaining adequate lateral control at the extremely low air speeds attainable with these air foils both in flight and when landing or taking off, a feat heretofore impossible of performance.

Attention is hereby directed to the drawings, illustrating one of the preferred forms of my invention, in which similar numerals of designation refer to similar parts throughout the several views and in which, Figure 1 is a view in perspective of the air foil, showing parts of the wing, wing flap, aileron, and flapper valve;

Fig. 6 is a plan view of the linkage and control mechanism shown in Figs. 2, 4, and 5;

Fig. 7 is an enlarged side elevation of such linkage and control mechanism, and adjacent parts; and Fig. 8 is an enlarged view of the hook and adjacent parts.

Figure 1:
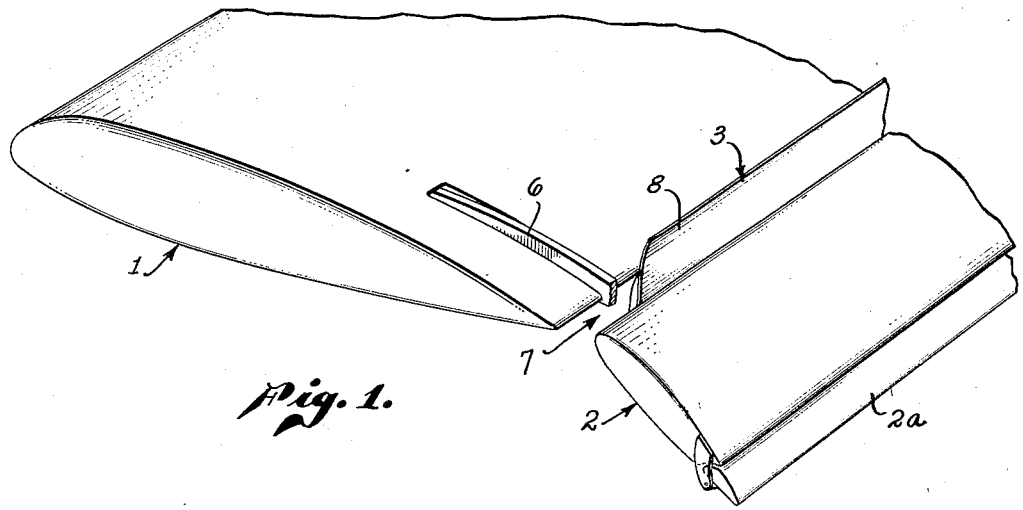

Referring to the drawings, auxiliary extensible wing flap 2 is of the well-known "Fowler" type construction, being arranged to be extended or retracted through the use of trolley beams 6, and other connections well known in the art, with controls convenient to the pilot for operation at his discretion. Swingingly secured by hinges 4 to the leading edge or nose of the wing flap 2 is the flapper valve 3, whose length and width are determined by the requirements of the particular installation and which is preferably in the form of an elongated strip of metal or other suitable material and is so shaped as to be readily turned by movement of the horn 10 affixed to its underside to assume the position shown in Figure 2, where it is inoperative; or so as to be turned, when in the operating position, in order that its upper portion 8 will extend into and above the space between the wing trailing end 5, and the leading edge or nose of the extensible wing flap 2, and that its lower portion 9 will extend downwardly below the extensible wing flap 2, as shown in Figure 3.

An automatic selector mechanism hereinafter described controls the action of the aforementioned flapper valve 3. It is to be understood that by means of the said automatic selector mechanism, hereinafter described or equivalent mechanism, normal and conventional movements of the control system executed by the pilot in all phases of flight and designed to operate the aforementioned conventional form of aileron and to correct or alter the existing attitude of the airplane laterally, shall induce proportionate movement of the aforementioned and described flapper valve 3 only when the extensible wing flap 2 is in the extended or operative position. Also it is to be borne in mind that by means of the said automatic selector mechanism or equivalent mechanism, normal and conventional movements of the control system executed by the pilot in all phases of flight shall induce absolutely no movement in the aforementioned and described flapper valve 3 when the extensible wing flap 2 is in the retracted or inoperative position shown in Fig. 2.

Be it further understood that by means of the said automatic selector mechanism, or equivalent mechanism, the retracting and locking action of the flapper valve 3 will take place at or during the period of retraction of the extensible wing flap 2, and utterly without regard, interference, or hinderance to any part or portion, device or mechanism incorporated in the remainder of the complete control system, or the displacement or lack of displacement, or movement or lack of movement of any part thereof, or control motion or lack of control motion of any kind whatsoever on the part of the pilot other than the action originally undertaken and necessary to retract or render inoperative, the aforementioned extensible wing flap 2, by whatever control means are provided therefor.

To the horn 10, affixed as aforesaid to the under side of the flapper valve 3, is pivotally secured one end of the push pull tube 11, the other end of which is pivotally secured to the lower end of the downwardly projecting lever 12, which has in its upper part a diagonal slot 29 in which slides the pin 20 serving slidably to connect said lever near its upper end to the plate 13, said lever being swingingly secured in bracket 19 by bolt 21 passing through its upper end. Extending through the arcuate slot 26 in the top of said plate 13, is the pin 24, serving slidably to connect said plate to the outer forward end of roller arm 23; and about the middle of said plate is the vertically extending slot 27 through which extends the pin 21, serving slidably to retain said plate in the bracket 19 mounted upon the web 25. As will be observed, the arm 23 carries both pin 16 and pin 24 and is pivoted intermediate its ends at 22. Near the top of the lever 14 which said lever is swingingly secured in bracket 19 by bolt 21 passing through its upper end and extending therethrough is the slot 28, somewhat enlarged above and diminished below into the lobe 30 shaped to engage with the shank of the pin 20; the said pin and slot serving to provide a loose or idling engagement of the lever 14 with lever 12 when the plate 13 is in the up position as shown in the drawings, but being closely connected otherwise when the wing flap is extended, at which time the pin is impelled into the lobe 30, and the two levers 12 and 14 operate as one. It will be here noted that the pin 20 extends on both sides of the plate 13 so as to engage the slot 29 in the arm 12 on one side and the slot 28 in the arm 14 on the other side.

A hook 18 is rigidly secured to the after end of the trolley support beam 6, said beam being part of the well known mechanism required to extend or retract the extensible wing flap 2. Pivotally affixed at about its midpoint by the pin 22 to the top of bracket 19 is the roller arm 23 carrying the roller 16, riding on the undersurface of the trolley support beam 6 throughout the retracted and semi-retracted positions of the extensible wing flap 2; and when said extensible wing flap 2 approaches its extreme rearward or fully extended position the aforementioned roller 16 is forced to move upward and becomes seated in and by the hook 18, at which time and by such action the flapper valve 3 will be in operative position and may be turned as shown in Fig. 3 to enter into the space between the wing 1 and wing flap 2, and by the degree of its entry therein, to control the turbulence of the air flowing thereover and thereby impair to a predetermined and controlled degree the lift of the wing flap 2.

Figure 2:
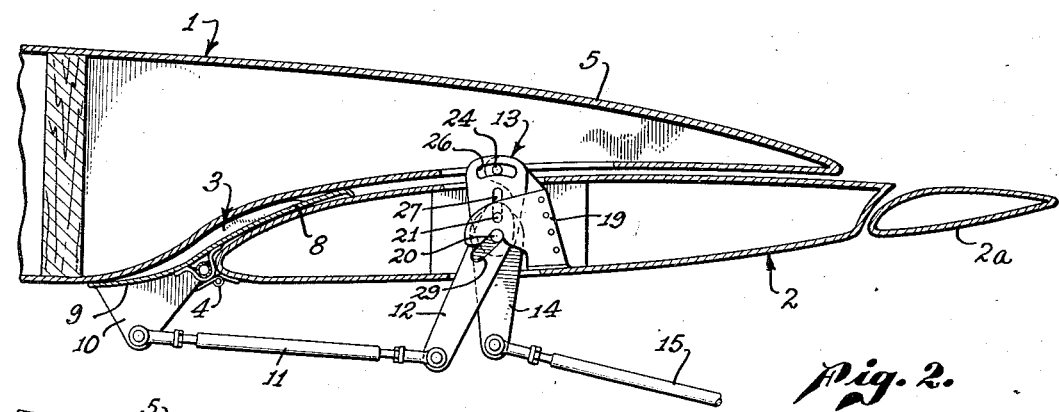
Fig. 2 is a longitudinal section of the trailing end portion of the main wing and adjacent parts, some of which are removed, showing the extensible wing flap including flapper valve and mechanism in the retracted position.
Figure 3:
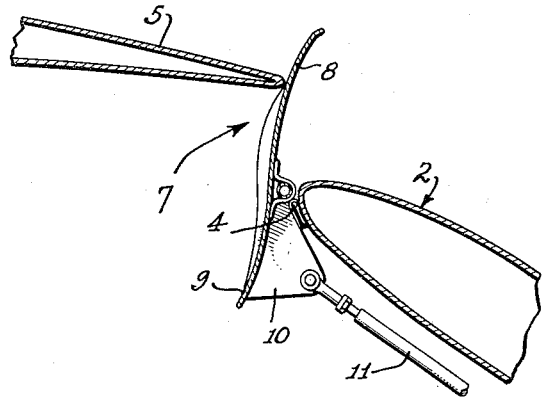
Fig. 3 is an enlarged section of the flapper valve and adjacent portion showing the valve in the open position.
Figure 4:
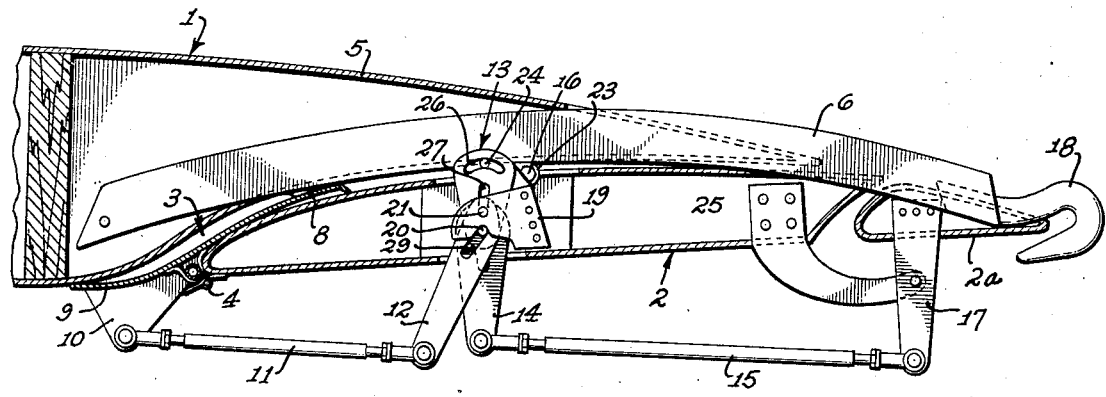
Fig. 4 is a view similar to that shown in Fig. 2, the selector mechanism being shown in more detail.
Figure 5:
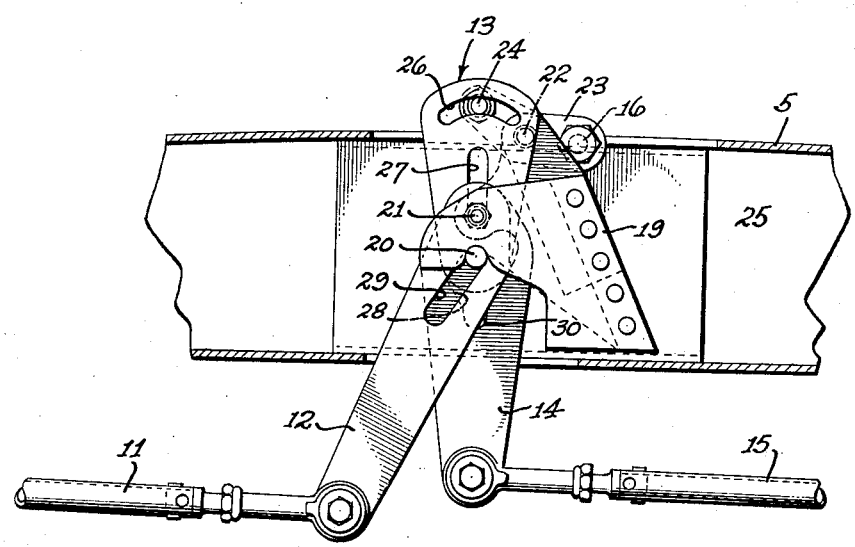
Fig. 5 is an enlarged view of the main portion of the selector mechanism.

It will thus be understood that when extensible wing flap 2 is in the retracted or inoperative position, the plate 13 due to the action of the roller arm 23 will be in the up or inoperative locked position shown in Fig. 2, and also when said flap is extended and protracted, and the roller 16 lodged in the hook 18, the plate 13 will be in the down or operative locked position.

And it is apparent that the slide pin 20 carried as an integral part of the slide plate 13, will be in constant engagement with the slots of levers 12 and 14, and when in the down or operative locked position due to the shape of the slots acts to lock the levers 12 and 14 together forcing said levers to operate as an integral unit thereby transmitting control forces from pushpull tube 15 directly to pushpull tube 11.

As aforementioned, the slide pin 20 carried as an integral part of the slide plate 13 is constantly engaged with the slots of levers 12 and 14 and when in the up or inoperative locked position, due to the slope angle of the slot in lever 12 forces said lever 12 forward and locks it to the support bracket 19 by means of a locking recess 19a in said support bracket 19, this being due to the expanding shape of the slot in lever 14 unlocking said lever 14 and permitting free idling motion of said lever 14 upon aforementioned hinge pin 21. The recess 19a is semicircular and is arranged to receive the pin 20 as shown best in Fig. 7 of the drawings.

Thus it will be seen that the forward position of lever 12 when in the inoperative locked position as shown in Figure 2 forces the flapper valve 3 to the retracted position as shown and maintains said flapper valve 3 in said retracted position until extensible wing flap 2 is returned to its extended or operative position.

The rearward end of pushpull tube 15 is pivotally connected to and derives its motion from the control horn 17 which is attached to the aileron 2a or is an integral part and downward extension, of same aileron. The said aileron 2a has conventional connections for being operated from the pilot's seat consisting of pull push mechanism, well understood in the art but is not herein described, as such forms of connections are in common use and are obvious to any mechanic skilled in the art and are to be understood as within the disclosure of my invention.

Be it understood that the use of the aileron 2a, swingingly attached to the trailing edge of the flap 2, constitutes a modification of the aforementioned well known Fowler flap and as shown is very advantageous to the mechanics of operation of the flapper valve 3 and related mechanism. The aileron 2a is aerodynamically useful for lateral control during the time that wingflap 2 is in its retracted and inoperative position and the control system of the said aileron 2a is useful for the operation of the flapper valve 3 and selective mechanism in the interest of avoiding duplication of controls.

It will be observed that the flapper valve 3 and aileron 2a are synchronously pivotal when the wing flap 2 is in its rearward and downward position, also that the aileron is independently pivotal when the wing flap 2 is in its forward position providing normal lateral control when the flapper valve 3 is not in use.

While I have described my invention as taking a particular form, it will be understood that the various parts may be changed without departing from the spirit thereof, and therefore I do not limit myself to the precise construction set forth, but consider that I am at liberty to make such changes and alterations as fairly come within the scope of the appended plans.

What I claim and desire to secure by Letters Patent is:

1. In a lateral control device, for aircraft, a main wing, a wing flap connected to and pivotally movable rearwardly and downwardly relatively to said main wing, a flapper valve pivotally mounted upon said wing flap intermediate said main wing and said wing flap, an aileron pivotally mounted on the rearward portion of said wing flap and control linkage means interconnecting said flapper valve and said aileron, whereby said flapper valve is synchronously pivotal with said aileron when said wing flap is in its rearward and downward position, said flapper valve having edges extending above and below said wing when said wing flap is in its rearward and downward position.

2. In a lateral control device, for aircraft, a main wing, a wing flap connected to and pivotally movable rearwardly and downwardly relatively to said main wing, a flapper valve pivotally mounted upon said wing flap intermediate said main wing and said wing flap, an aileron pivotally mounted on the rearward portion of said wing flap and control linkage means interconnecting said flapper valve and said aileron, whereby said flapper valve is synchronously pivotal with said aileron when said wing flap is in its rearward and downward position, said flapper valve having edges extending above and below said wing when said wing flap is in its rearward and downward position, said wing flap being spaced from said main wing when said wing flap is in its rearward and downward position, said flapper valve being arranged to change the size of the space between said main wing and said wing flap, and when closed being arranged to block all airflow between said main wing and said wing flap.

3. In a lateral control device, for aircraft, a main wing, a wing flap connected to and pivotally movable rearwardly and downwardly relatively to said main wing, a flapper valve pivotally mounted upon said wing flap intermediate said main wing and said wing flap, an aileron pivotally mounted on the rearward portion of said wing flap and operating means including separable control linkages interconnecting said flapper valve and said aileron, and latch means connecting said control linkages at their adjacent ends, whereby said flapper valve is synchronously pivotal with said aileron when said wing flap is in its rearward and downward position and stationary stop means in connection with said main wing engageable by said latch means when said wing flap moves backwardly for actuating the same to connect said flapper valve in synchronous relation with said aileron.

4. In a lateral control device, for aircraft, a main wing, a wing flap connected to and pivotally movable rearwardly and downwardly relatively to said main wing, a flapper valve pivotally mounted upon said wing flap intermediate said main wing and said wing flap, an aileron pivotally mounted on the rearward portion of said wing flap and disconnectible control linkage means interconnecting said flapper valve and said aileron, whereby said flapper valve is synchronously pivotal with said aileron when said wing flap is in its rearward and downward position, said flapper valve having edges extending above and below said wing when said wing flap is in its rearward and downward position, and means arranged for disconnecting said linkage means to permit said aileron to operate independently of said flapper valve when said wing flap is in its forward position.

5. In a lateral control device, for aircraft, a main wing, a wing flap connected to and pivotally movable rearwardly and downwardly relatively to said main wing, a flapper valve pivotally mounted upon said wing flap intermediate said main wing and said wing flap, an aileron pivotally mounted on the rearward portion of said wing flap and operating means including separable control linkages interconnecting said flapper valve and said aileron, and latch means connecting said control linkages at their adjacent ends, whereby said flapper valve is synchronously pivotal with said aileron when said wing flap is in its rearward and downward position, stationary stop means in connection with said main wing engageable by said latch means when said wing flap moves backwardly for actuating the same to connect said flapper valve in synchronous relation with said aileron, said wing flap spaced from said main wing when said wing flap is in its rearward and downward position, said flapper valve arranged to change the size of the space between said main wing and said wing flap and when closed is arranged to block all airflow between said main wing and said wing flap.

MILLARD C. BOYD.